United States Patent [19]

Togawa et al.

[11] Patent Number: 4,483,200
[45] Date of Patent: Nov. 20, 1984

[54] THERMAL PULSE FLOWMETER

[75] Inventors: Tatsuo Togawa, Hino; Tetsu Nemoto, Suginami; Hirohisa Tsubakimoto, Chofu, all of Japan

[73] Assignee: Anima Corporation, Tokyo, Japan

[21] Appl. No.: 422,975

[22] PCT Filed: Jan. 18, 1982

[86] PCT No.: PCT/JP82/00017
§ 371 Date: Sep. 9, 1982
§ 102(e) Date: Sep. 9, 1982

[87] PCT Pub. No.: WO82/02591
PCT Pub. Date: Aug. 5, 1982

[30] Foreign Application Priority Data

Jan. 19, 1981 [JP] Japan .................................. 56-6836
Jun. 10, 1981 [JP] Japan ............................. 56-86144[U]

[51] Int. Cl.³ ............................................. G01F 1/68
[52] U.S. Cl. ................................... 73/861.05; 73/204

[58] Field of Search .............................. 73/861.05, 204

[56] References Cited

U.S. PATENT DOCUMENTS

4,228,683 10/1980 Juffa et al. .......................... 73/204
4,237,730 12/1980 Feng ................................... 73/204

Primary Examiner—Herbert Goldstein
Attorney, Agent, or Firm—Pollock, Vande Sande & Priddy

[57] ABSTRACT

A hot-wire flowmeter includes a hot wire heated pulsatively for heating a fluid being measured, and a thermosensitive detector located downstream of the hot wire for detecting the heated fluid. The hot wire is heated again in response to an output signal from the detector with the result that the hot wire is periodically heated at a rate that is dependent on the speed of flow of the fluid. The rate of flow of the fluid can be derived from the rate at which the hot wire is periodically heated.

16 Claims, 10 Drawing Figures

THERMAL PULSE FLOWMETER

TECHNICAL FIELD

The present invention relates to a hot-wire pulse flowmeter for use in measurement of the rate of flow of an expiration or inspiration, for example, for pulsatively heating the fluid being measured and detecting the heated fluid downstream of a position in which the fluid has been heated to thereby measure the speed of flow of the fluid.

BACKGROUND ART

It has been customary practice to measure the rate of flow of a fluid by heating the fluid with thermal pulses at an upstream position in a pipe through which the fluid flows, detecting the heated fluid at a position spaced a certain distance downstream from the position in which the fluid has been heated, and measuring an interval of time which has elapsed after the fluid has been heated and before the heated fluid is detected, for thereby measuring the speed of flow of the fluid. The average speed of flow v can be expressed as follows:

$$v = L/S \text{ (cm/sec)} \quad (1)$$

where L is the rate of flow of the fluid (ml/sec) and S is the cross-sectional area of the pipe through which the fluid flows.

Assuming that a heater unit located upstream in the pipe for heating the fluid is spaced from a thermosensitive unit disposed downstream of the heater unit in the pipe by a distance d (cm), and an interval of time T elapses after the fluid has been heated by the heater unit and before the heated fluid is detected by the thermosensitive unit, the following equation can be derived:

$$T = 1/L \cdot S \cdot d \text{ (sec)} \quad (2)$$

As can be seen from the equation (2), as the rate of flow L of the fluid increases, the time interval T decreases in inverse proportion. Conventional hot-wire flowmeters have heated the fluid periodically. It has been difficult to set the period at which the fluid is to be heated by the heater unit in a system in which the rate of flow of the fluid is subjected to large changes. More specifically, if the heating period were too large, then the measurement time would be prolonged and rapid changes in the rate of flow of the fluid could not be followed, resulting in a failure in proper measurements in which such rapid changes are reflected. If the heating period were too short, then the fluid as detected downstream in the pipe per unit time would be adversely affected by heating in a next period, with the result that detection of the heated fluid would be inaccurate.

Fluids to be measured are of a variety of compositions, available in a wide range of rates of flow, and are measured for their rates of flow under various conditions such as ambient temperature, pressure, and the like. Under such various conditions, the fluids are heated by the heater unit under varied conditions, and cannot be heated to a constant temperature. For example, as the speed of flow of the fluid increases, an increased amount of thermal energy is lost from the heater which is then reduced in resistance, and hence the fluid is heated less intensively. If the heated portion of the fluid had different temperatures at the thermosensitive unit, it would be unable to detect the heated portion of the fluid reliably.

It is an object of the present invention to provide a thermal pulse flowmeter having a wide range of measurements.

Another object of the present invention is to provide a thermal pulse flowmeter capable of measuring a fluid flowing at rapidly and largely changing rates, such as an expiration or inspiration.

DISCLOSURE OF THE INVENTION

According to the present invention, a heater is disposed in a pipe through which a fluid to be measured, and is supplied with thermal pulses from a heater circuit to heat the fluid pulsatively. A detector is mounted in the pipe downstream of the heater and is responsive to temperature for detecting passage of a heated portion of the fluid. Upon such detection, a drive timing signal is generated which drives the heater circuit again to heat the heater. The period of repetition at which the heater is heated is measured, and the rate or speed of flow of the fluid is displayed dependent on the measured period.

Thus, the heater is heated again in response to detection of passage of the heated fluid across the detector. The period at which the heater is heated becomes automatically reduced as the speed of flow of the fluid increases. This arrangement allows the heater to be heated at an appropriate period dependent on the speed of flow of the fluid. The heating period should preferably be twice the interval of time which has elapsed after the heater has been heated and before the heated fluid reaches the detector. When the rate of flow of the fluid is below a measurable minimum, the heater is preheated at a constant period so that a fluid which is introduced abruptly can properly be measured for its rate of flow from the time the fluid surges. The heater circuit is constructed such that the heater can heat the fluid up to a substantially constant temperature irrespectively of the rate of flow thereof for reliable detection by the detector. Reliable detection by the detector can also be achieved by detecting a minimum level of an output from the detector, adding a certain level to the minimum level to produce a reference value, and detecting passage of the heated fluid when the output from the detector exceeds the reference value. To protect the flowmeter against adverse affects due to changes in the ambient temperature and in the temperature of the fluid itself, there is added a compensation detector located in the pipe at a position in which the compensation detector is capable of sensing the ambient temperature and the temperature of the fluid, but is not traversed by the heated fluid portion flowing through the pipe, for reliably detecting passage of the heated fluid portion.

BEST MODE FOR CARRYING OUT THE INVENTION

Figure 1:
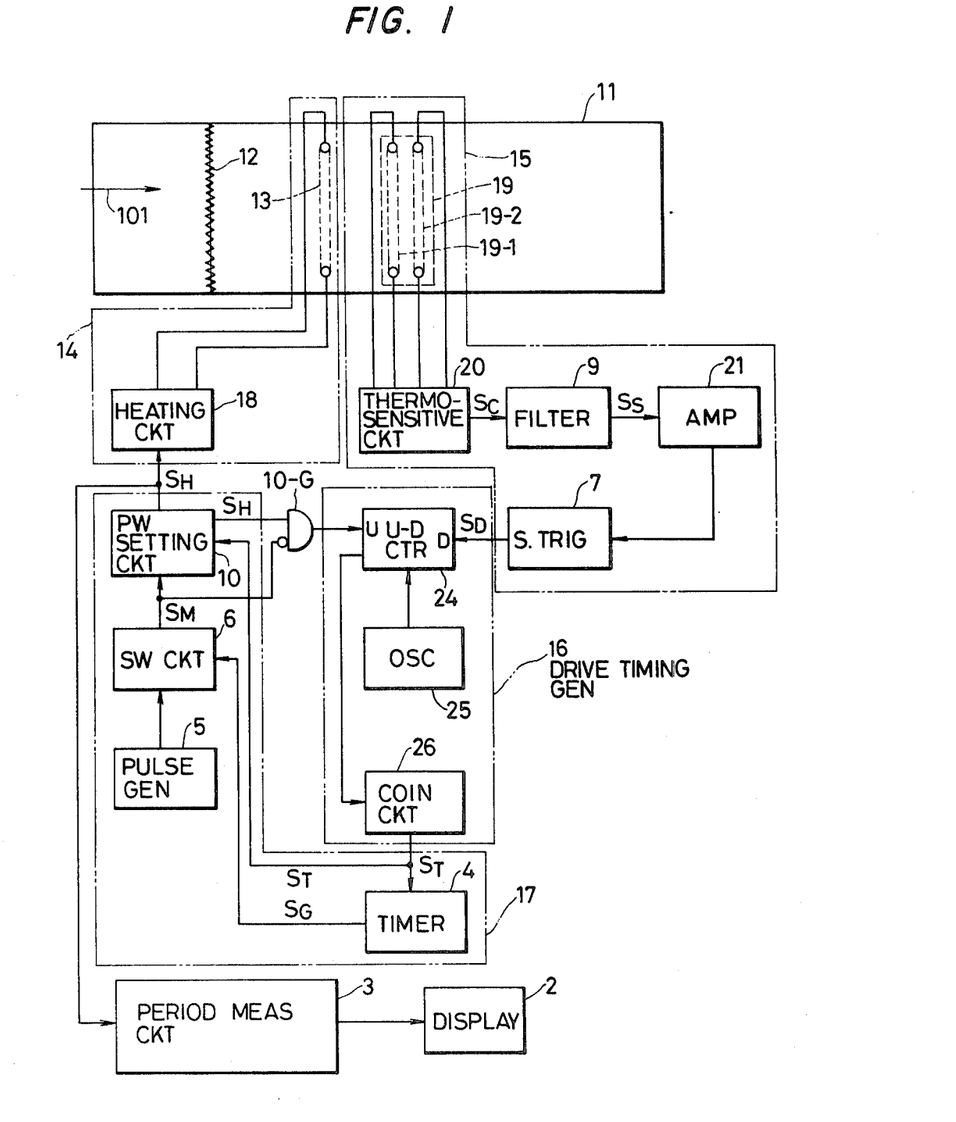
FIG. 1 is a block diagram of a thermal pulse flowmeter according to an embodiment of the present invention.

FIG. 1 is illustrative of the arrangement of a thermal pulse flowmeter according to an embodiment of the present invention. The thermal pulse flowmeter comprises a pipe 11 for passage therethrough of a fluid 101 to be measured, the pipe 11 having a flow disturbance generator 12 disposed on one side at an upstream position of the pipe 11. The flow disturbance generator 12 may for example be a metal wire mesh lying in a plane extending normal to the direction of flow of the fluid 101 to be measured. The fluid 101 introduced into the pipe 11 is a laminar flow in general which has a certain speed distribution in a plane normal to the direction of flow thereof. The fluid 101 thus introduced as a laminar flow is disturbed by the flow disturbance generator 12 so that the fluid 101 will have a uniform average speed of flow in a plane normal to the direction of flow.

A heater 13 is mounted in the pipe 11 downstream of the flow disturbance generator 12 and extends diametrically of the pipe 11 across the fluid flow. The heater 13 may for example comprise a wire of tungsten having a diameter of 5 microns. The heater 13 serves to emit a thermal pulse into the fluid 101 to heat the latter. There is provided a heater circuit unit 14 having a heating circuit 18 energizable by a heating current pulse of a predetermined pulse width generated by a heating pulse width setting circuit 10. The heater 13 is connected to the heating circuit 18, so that the heater 13 will be heated when the heating circuit 18 is energized for thereby heating the fluid 101 with such a thermal pulse.

The pipe 11 has therein a thermosensitive circuit unit 15 located downstream of the heater circuit unit 14. The thermosensitive circuit unit 15 includes a detector 19 disposed in the pipe 11 and responsive to the temperature of the fluid 101. The detector 19 has output terminals connected to a thermosensitive circuit 20 having output terminals coupled to an amplifier 21 via a filter 9. The fluid to be measured which is heated by the thermal pulse is detected as an electric pulse by the detector 19 and the thermosensitive circuit 20, and a DC component of such an electric pulse is blocked off by the filter 9. An output signal from the filter 9 is supplied via the amplifier 20 to a Schmitt trigger 7 which generates an operation signal $S_D$ at its output when the pulse signal delivered from the amplifier 21 exceeds a certain value.

The operation signal $S_D$ drives a drive timing generator circuit 16 to enable the latter to produce a drive timing signal $S_T$ at a timing dependent on the speed of flow of the fluid 101. The fluid 101 is heated on the basis of such a drive timing signal $S_T$.

Therefore, the fluid 101 is heated by a thermal pulse generated from the heater 13. The heated fluid 101 reaches the detector 19 after an interval of time dependent on the speed of flow of the fluid. If the speed of flow is high, then it will take a short time for the heated fluid 101 to arrive at the detector 19. If the speed of flow is low, then the time required, for the heated fluid 101 to reach the detector 19 is long. Upon detection of the heated fluid by the detector 19, the heater 13 is energized to heat the fluid 101 again. Such a process is repeated over and over. The period at which the heater 13 is heated, that is, the period of the drive timing signal $S_T$ becomes shorter as the speed of flow of the fluid 101 is higher, and becomes longer as the speed of flow of the fluid 101 is lower. The speed or rate of flow of the fluid 101 can be measured by measuring such a period. When the speed of flow of the fluid 101 in the pipe 11 is lower than a predetermined value, the fluid 101 is heated at a certain repetitive period irrespective of the drive timing signal $S_T$, and thus the heater 13 is maintained at a predetermined minimum temperature even when the fluid 101 in the pipe 11 is not to be measured or does not flow through the pipe 11.

An application of the thermal pulse flowmeter of the invention is to measure the rate of flow of an expiration and inspiration. Since the rate of flow of such a fluid changes abruptly and in a wide range with respect to time, it is necessary that the heater 13 be heated to apply a sufficient thermal pulse to the fluid to measure its rate of flow accurately even when the rate of flow is subjected to an abrupt variation. To this end, there is added means for preheating the heater 13.

The preheating means is constructed as follows: A timer 4 is provided which is set for an interval of time slightly longer than the period of the drive timing signal ST corresponding to the measured minimum rate of flow of the fluid. The timer 4 is driven by the drive timing signal $S_T$ to produce an inhibit gate signal Sg during the interval of time set by the timer 4 for closing the gate of a switch circuit 6. As long as the timer 4 is supplied with the drive timing signal $S_T$ during the time interval set by the timer 4, the gate of the switch circuit 6 remains closed. When the next drive timing signal $S_T$ is supplied to the timer 4 after the elapse of the set time interval initiated by the preceding drive timing signal, the timer 4 does not generate the inhibit gate signal Sg until the reception of the said next drive timing signal, during which the gate of the switch circuit 6 is opened. With the switch circuit 6 open, it allows pulses to be supplied from a pulse generator 5 to the heater circuit 18.

The drive timing generator circuit 16 includes an up-down counter 24 which starts counting a signal such for example as a signal having an oscillation frequency of 20 KHz generated by an oscillator 25 in response to a heating pulse $S_H$ from the pulse width setting circuit 10 while the heater circuit 18 is being driven by the drive timing signal $S_T$. The up-down counter 24 counts up the signal during an interval of time in which the heated fluid flows from the heater 13 to the detector 19, and counts down the signal in response to the operation signal $S_D$ from the thermosensitive circuit unit 15. A coincidence circuit 26 detects when the count as it is counted down agrees with the final count as it has been counted up, and produces a coincidence signal which serves as the drive timing signal $S_T$.

While the period as detected by the detector 19 is smaller than the time interval set by the timer 4, the heating pulse width setting circuit 10 is driven by the drive timing signal $S_T$ at a period twice the period of time which elapses from the heating of the fluid to the detection by the detector 19, thereby producing a heating pulse $S_H$. When the period as detected by the detector 19 is larger than the time interval set by the timer 4, on the other hand, the timer 4 stops supplying the inhibit gate signal Sg after elapse of each predetermined time interval thereby opening the gate of the switch circuit 6. A pulse signal of 10 Hz, for example, is supplied from the pulse generator 5 through the switch circuit 6 to the pulse width setting circuit 10, which then issues the heating pulse $S_H$. The heating pulse $S_H$ is prevented by an inhibit gate circuit 10-G from being delivered to the up-down counter 24.

A period measuring circuit 3 is connected to an output of the pulse width setting circuit 10. The period measuring circuit 3 has an output connected to a display unit 2 which serves to display the measured period or frequency as it is calibrated as the rate of speed or flow of the fluid being measured.

Figure 2:
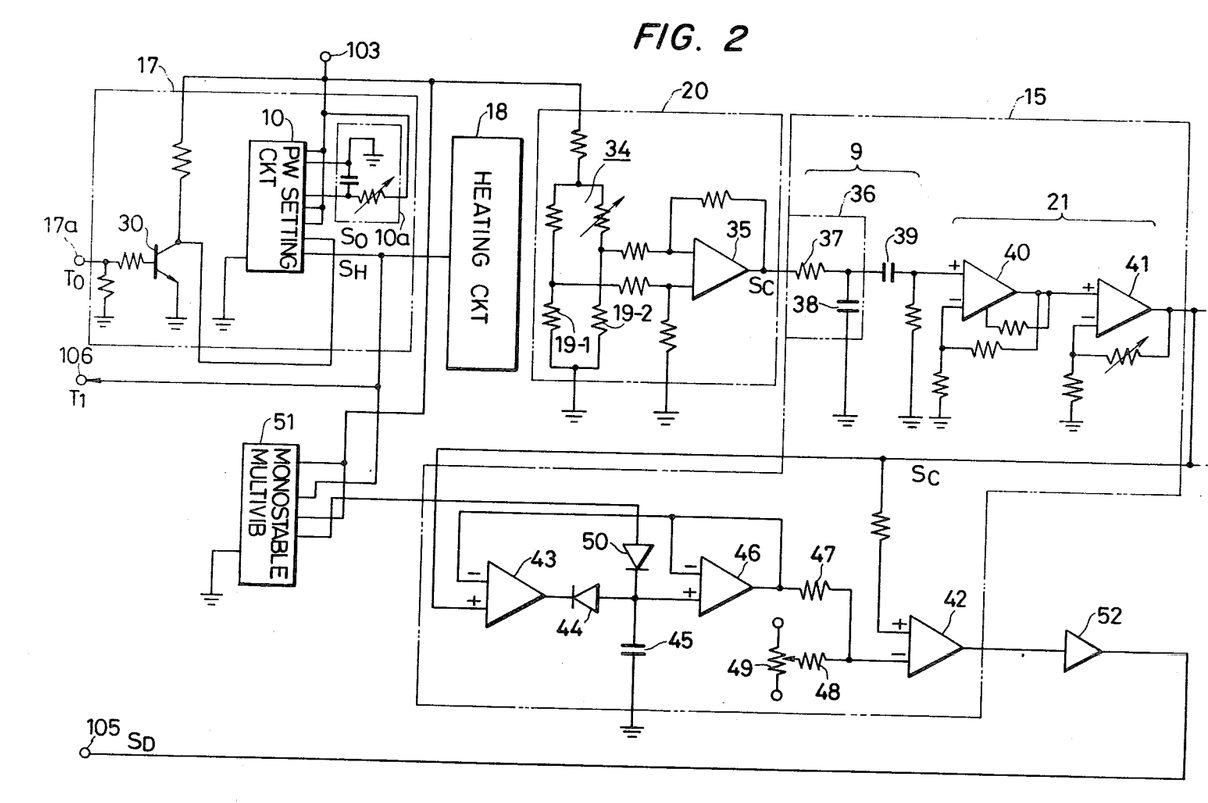
FIG. 2 is a a circuit diagram, partly in block form, of a thermosensitive circuit unit 15 and other circuits in the thermal pulse flowmeter shown in FIG. 1.

The components of the thermal pulse flowmeter will now be described in more detail. As shown in FIG. 2, a start signal is supplied via a terminal 17a to the base of a transistor 30 for measuring operation. The transistor 30 produces an output for driving the pulse width setting circuit 10. The pulse width setting circuit 10 is composed of a monostable multivibrator, for example, and has a time constant circuit 10a with its time constant adjusted to set the pulse width of the heating pulse $S_H$. When the heating pulse $S_H$ is applied to the heater circuit 18, the heater 13 is instantaneously supplied with an electric current which heats the heater.

Figure 6:
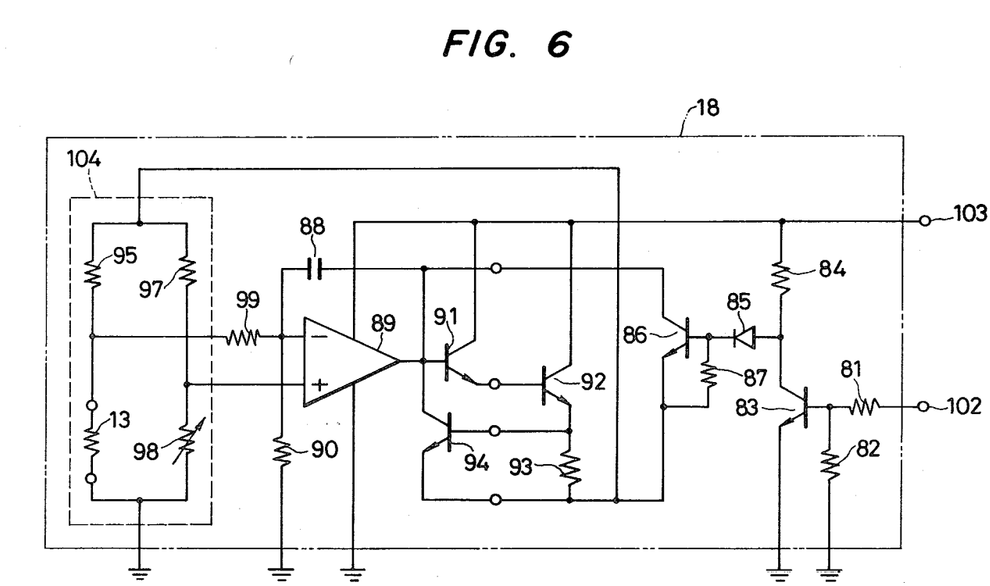
FIG. 6 is a circuit diagram of a heater circuit 18 in the thermal pulse flowmeter shown in FIG. 1.

The heater circuit 18 is constructed as shown in FIG. 6. Series-connected resistors 81, 82 are connected between an input terminal 102 and ground. The resistors 81, 82 are connected through a junction which is coupled to the base of a transistor 83 with its emitter grounded. A resistor 84 is connected between the collector of the transistor 83 and a power supply terminal 103 to which a certain voltage such as 30 volts is applied. A diode 85 has an anode connected to the collector of the transistor 83 and a cathode connected to the base of a transistor 86. A resistor 87 is coupled between the base and emitter of the transistor 86. The collector of the transistor 86 is connected to the output terminal of an amplifier 89 having an inverting input terminal grounded through a resistor 90 and connected through a capacitor 88 to the output terminal of the amplifier 89. The output terminal of the amplifier 89 is connected to the base of a transistor 91 having an emitter coupled to the base of a transistor 92 with its emitter coupled via a resistor 93 to the emitter of the transistor 86. The emitter of the transistor 92 is also connected to the base of a transistor 94 which has an emitter joined to the emitter of the transistor 86. The collector of the transistor 94 is connected to the output terminal of the amplifier 89 and hence to the collector of the transistor 86.

A bridge circuit 104 comprises the heater 13, resistors 95, 97, and a variable resistor 98 and has output terminals connected to a junction between the resistor 95 and the heater 13 and a junction between the resistor 97 and the variable resistor 98. The heater 13 and the resistor 98 are interconnected through a junction connected to ground. The junction between the resistors 95, 97 is connected to the emitter of the transistor 86. The junction between the heater 13 and the resistor 95 is coupled through a resistor 99 to the inverting input terminal of the amplifier 89, and the junction between the resistors 97, 98 is joined to the noninverting input terminal of the amplifier 89.

When there is no heating pulse applied to the input terminal 102, the transistor 83 is cut off and thus the diode 85 is rendered conductive to energize the transistor 86. With the collector of the transistor 86 connected to the base of the transistor 91, the transistors 91, 92 are de-energized. Although a small current flows from the power supply terminal 103 through the diode 85 and the base and emitter of the transistor 86 into the branches of the bridge circuit 104, the heater 13 remains substantially unheated.

When a heating pulse is applied to the input terminal 102, the transistor 83 is energized to lower the voltage at the anode of the diode 85, whereupon the transistor 86 is de-energized. Upon de-energization of the transistor 86, an output signal from the bridge circuit 104 is amplified by the amplifier 89 which produces an output to render the transistor 91 conductive. The energization of the transistor 91 then energizes the transistor 92. When the transistor 92 is energized, a current flows from the power supply terminal 103 through the transistor 92 and the resistor 93 into the bridge circuit 104. When the current starts flowing, the heater 13 remains cool and has a low resistance with the result that the voltage at the noninverting input of the amplifier 89 is substantially higher than that at the inverting input thereof. Thus, the amplifier 89 produces an output voltage which causes a large current to flow through the transistors 91, 92. This current increases the current flowing through the heater 13, which is then heated and has an increasing resistance. The current flowing through the heater 13 continues to increase until the bridge circuit 104 is brought into a state of balance or equilibrium. Therefore, the heater 13 can be heated up to a predetermined temperature. The manner in which the heater 13 is cooled depends on the speed of flow of the fluid being measured. However, the circuit arrangement shown in FIG. 6 enables the heater 13 to heat the fluid at a constant temperature regardless of the speed of flow of the fluid.

When an excessive current flows through the transistor 92, the transistor 94 is energized to thereby de-energize the transistor 91 and hence the transistor 92.

When the heater 13 is heated, the fluid which traverses the heater 13 is heated thereby. As the heated fluid passes through the detector 19, the latter is heated and the heating is detected. The detector 19 and the thermosensitive circuit 20 are constructed as illustrated in FIG. 2. The detector 19 is in the form of a thermosensitive resistor having its resistance variable with temperature. The thermosensitive circuit 20 has a bridge 34 with the detector 19 in one of its branches, and an amplifier 35 connected across output terminals of the bridge 34. When the fluid as heated by the heater 13 passes through the detector 19, the latter is heated and the bridge 34 is brought out of balance, whereupon the amplifier 35 generates a detection signal Sc.

Figure 5:
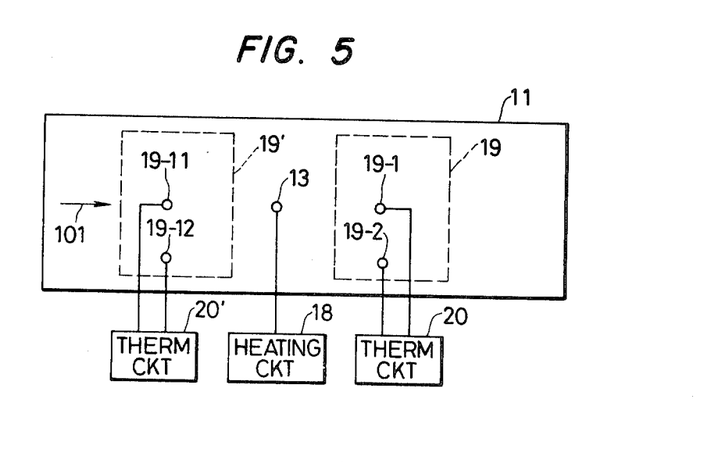
FIG. 5 is a diagram illustrative of a heater and detectors as located with respect to each other for measuring the rate of a flow directed in one and opposite directions.

In the embodiment as shown in FIG. 1, the detector 19 comprises a pair of first and second detectors 19-1, 19-2 which extend perpendicularly to the direction of flow of the fluid as illustrated in FIG. 5. The fluid as heated by the heater 13 traverses one of the detectors 19-1 while the heated fluid does not pass through the detector 19-2. For measurement of an expiration, a thermal energy which is given by the human body to the expiration is equally imparted to the detectors 19-1, 19-2. The detectors 19-1, 19-2 are connected in adjacent branches of the bridge 34. Any influence of the thermal energy given by the human body to the fluid can thus be removed for proper detection of passage of the fluid as heated by the heater 13. When the expiration and inspiration are to be measured independently of each other, two sets of detectors 19, 19' are disposed one on each side of the heater 13 as illustrated in FIG. 5. The detector 19' includes detectors 19-11, 19-12 which correspond functionally to the detectors 19-1, 19-2, respectively.

Turning back to FIG. 2, the detection signal Sc as detected by the thermosensitive circuit 20 is supplied to an integrating circuit 36 composed of a resistor 37 and a capacitor 38 by which high-frequency noise components are removed from the detection signal. An output from the integrating circuit 16 is delivered to a capacitor 39 which blocks off a DC component in the detection signal Sc. The detection signal Sc from which the DC component has been removed is amplified by amplifiers 40, 41, and the amplified detection signal Sc is supplied to a noninverting input terminal of a comparator 42 of the thermosensitive circuit unit 15.

The output terminal of the amplifier 41 is connected to a noninverting input terminal of a comparator amplifier 43 having an output terminal coupled to the cathode of a diode 44. The diode 44 has an anode connected to one end of a capacitor 45 the other end of which is grounded. The anode of the diode 44 is also coupled to a noninverting input terminal of a buffer circuit 46. The inverting input terminals of the comparator amplifier 43 and the buffer circuit 46 are interconnected. The buffer circuit 46 has an output terminal connected through a resistor 47 to an inverting input terminal of the comparator 42, which is connected via a resistor 48 to a movable terminal of a variable resistor 49. Although not shown, a power supply is connected across the resistor 49. The anode of the diode 44 is joined to the cathode of a diode 50 having an anode connected to an output terminal of a monostable multivibrator 51. The comparator 42 has an output terminal connected to an inverter 52. The monostable multivibrator 51 has an input terminal supplied with the heating pulse $S_H$. Each time the heating pulse $S_H$ is supplied, the multivibrator 51 produces an output which charges the capacitor 45 to a predetermined voltage through the diode 50. The voltage across the capacitor 45 is applied through the buffer circuit 46 to the inverting input of the comparator amplifier 43. The comparator amplifier 43 compares the output from the amplifier 41 at a low level containing no detection pulse Sc with the output from the buffer circuit 46. The capacitor 45 continues to be discharged through the diode 44 until the inputs to the comparator amplifier 43 coincide with each other. In this manner, the lowest level from the amplifier 41 with no detection pulse Sc contained appears at the output of the buffer circuit 46. To such lowest level is added a predetemined value from the movable terminal of the variable resistor 49, and the sum is given as a reference value to the comparator 42. When the detection pulse Sc exceeds the reference value, the comparator 42 produces an inverted output having a higher logic level "1" which is fed as the operation signal $S_D$ through a buffer circuit 52 to a terminal 105. In FIG. 2, the Schmitt trigger 7 shown in FIG. 1 is replaced with the comparator 42.

Figure 3:
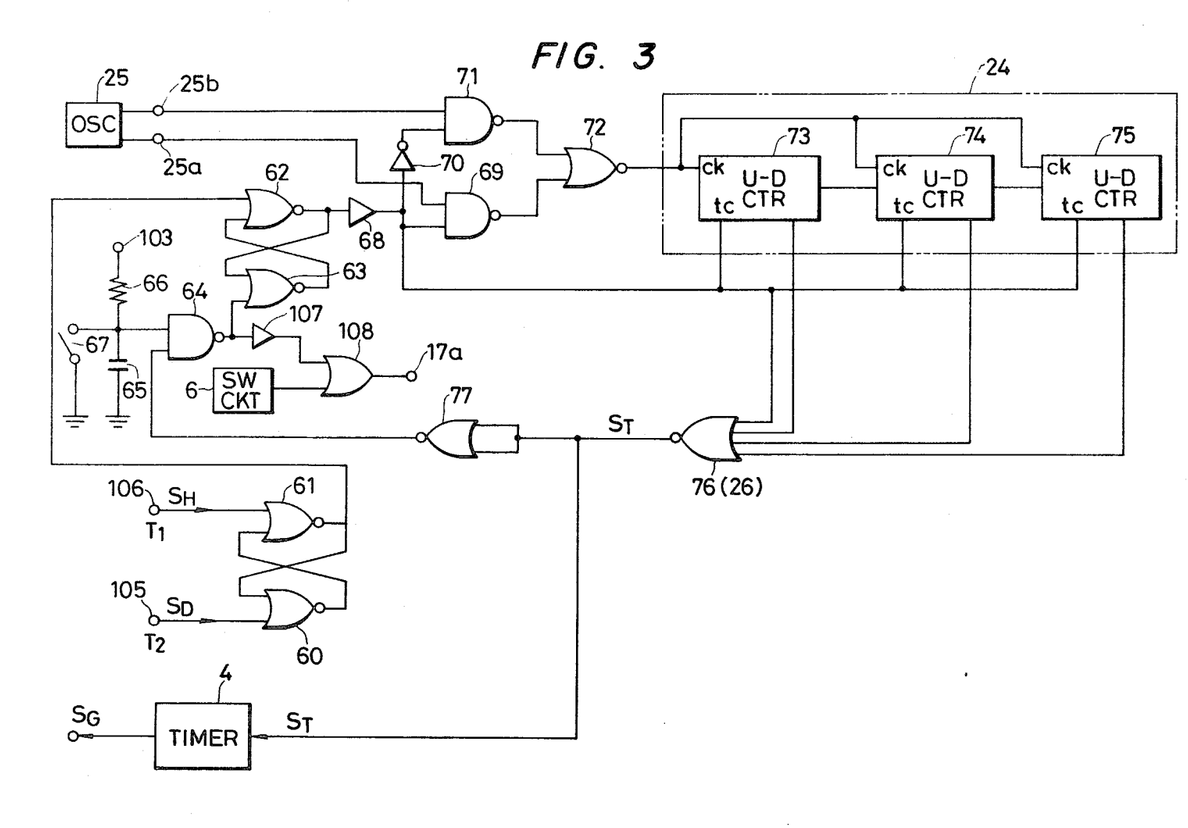
FIG. 3 is a logic diagram of a drive timing signal circuit 16 in the thermal pulse flowmeter illustrated in Fig. 1.

FIG. 3 shows a circuit for driving the up-down counter 24. The operation signal S from the comparator 42 in FIG. 2 is supplied to an input terminal of a NOR gate 60, which cooperates with another NOR gate 61 in constituting a flip-flop. The NOR gate 61 has an output terminal connected to an input terminal of a NOR gate 62 which cooperates with another NOR gate 63 in forming a flip-flop. The NOR gate 63 has an input terminal connected to the output terminal of a NAND gate 64 having an input terminal grounded through a capacitor 65 and connected to a power supply terminal 103 through a resistor 66. A start switch 67 is connected across the capacitor 65. The NOR gate 62 has an output, terminal connected through a buffer circuit 68 to an input terminal of a NAND gate 69 and an inverter 70. The other input terminal of the NAND gate 69 is supplied with a reference signal from a terminal 25a of an oscillator 25. The inverter 70 has an output terminal connected to an input terminal of a NAND gate 71 the other input terminal of which is also supplied with a reference signal from a terminal 25b of the oscillator 25. The NAND gates 69, 71 have output terminals connected respectively to input terminals of a NOR gate 72 having an output terminal connected to the clock terminals of series-connected up-down counters 73, 74, 75 which jointly constitute the up-down counter 24. The up-down counters 73, 74, 75 have up-count and down-count control terminals $t_c$ coupled to the output terminal of the buffer circuit 68.

The control terminals $t_c$ and zero-count output terminals $t_{01}$, $t_{02}$, $t_{03}$ of the counters 73, 74, 75 are connected to input terminals of a NOR gate 76 having an output terminal connected via a NOR gate 77 to the other input terminal of the NAND gate 64. The NOR gate 76 serves as the coincidence circuit 26 shown in FIG. 1.

For starting the up-down counter, the switch 67 is closed to allow the output from the NAND gate 64 to be supplied as a start signal of "1" to the base of the transistor 30 (FIG. 2) through a buffer cicuit 107, an OR gate 108 and the terminal 17a, whereupon the pulse width setting circuit 10 generates the heating pulse $S_H$. The heating pulse $S_H$ is also supplied to an input terminal of the NOR gate 61. When the NOR gate 63 is supplied with a signal of a logic level "1" from the NAND gate 64, the NOR gate 62 produces an output signal having a logic level "1" which is delivered through the buffer circuit 68 to the control terminals $t_c$ of the counters 73, 74, 75 to start counting up the reference signal of a frequency of 20 KHz, for example, which is supplied from the terminal 25a of the oscillator 25 through the NAND gate 69 and the NOR gate 72.

When the operation signal $S_D$ is issued from the buffer circuit 52 upon detection by the detector 19 of the thermal pulse imparted to the fluid to be measured, the operation signal $S_D$ is applied through the terminal 105 to the NOR gate 60. Then, the NOR gate 61 produces an output of a logic level "1", which is supplied to the NOR gate 62 that generates an output signal at a logic level "0". The buffer circuit 68 therefore issues an output at a logic level "0", whereupon the counters 73, 74, 75 start to count down the reference signal supplied from the terminal 25b of the oscillator 25 through the NAND gate 71 and the NOR gate 72.

During the count-down mode, the control terminals $t_c$ produce signals at a logic level "0". When the counts which have been counted up previously are all counted in the count-down mode, the output terminals $t_{01}$, $t_{02}$, $t_{03}$ produce signals at a logic level "0", whereupon the NOR gate 76 produces at its output terminal the drive timing signal $S_T$. The drive timing signal $S_T$ is supplied via the NOR gate 77 to the NAND gate 64. The heater 13 is heated again and the counter 24 starts to count up the signal again to thereby repeat the foregoing process. The period of repetition depends on the speed of flow of the fluid. Where the reference signals from the terminals 25a, 25b are equal in frequency to each other, the repetitive period is twice the interval of time required for the fluid heated by the heater 13 to reach the detector 19. With the reference signals having an equal frequency, the gates 69, 70, 71, 72 may be dispensed with and the reference signal from the terminal 25a may directly be supplied to the counter 24. The period of the drive timing signal $S_T$ or the heating pulse $S_H$ is measured by the measurement circuit 3 (FIG. 1), which enables the display unit 2 to display the speed or rate of flow of the fluid being measured.

As described above, the drive timing signal $S_T$ is also supplied to the timer 4. While the drive timing signal $S_T$ is smaller than the reference period corresponding to the minimum rate of flow, the pulse width setting circuit 10 is driven by the drive timing signal $S_T$. When the period of the drive timing signal $S_T$ is slighly longer then the reference period, the timer 4 stops supplying the gate signal Sg after elapse of each predetermined time interval. Then, the output signal $S_M$ from the switch circuit 6 is fed to the OR gate 108 which produces an output to drive the pulse width setting circuit 10. In this mode, when the power supply switch is turned on, the heater 13 is periodically heated by the output from the switch circuit 6 even if the rate of flow of the fluid is zero. This is the case even with no start switch 67 installed. Where the timer 4, the pulse generator 5 and the switch circuit 6 are incorporated, the resistor 66, the capacitor 65, the switch 67, the gates 64, 77, and the buffer circuit 107 shown in FIG. 3 may be dispensed with and the output terminal of the NOR gate 76 may directly be connected to the inputs of the NOR gate 63 and the OR gate 108. Furthermore, the NOR gates 60, 61 in FIG. 3 may be dispensed with to supply the signal $S_D$ from the terminal 105 directly to the NOR gate 62.

Figure 4:
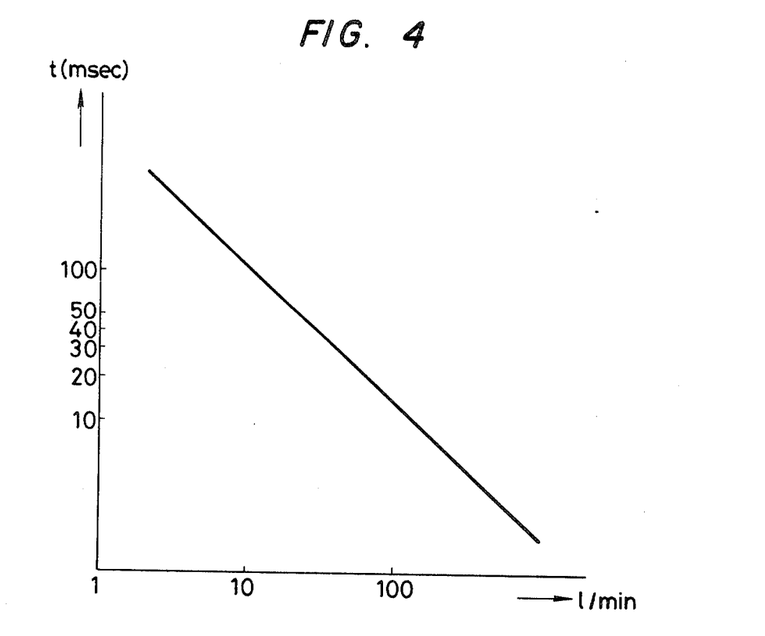
FIG. 4 is a graph showing a relationship between the flow rate and heating period in the flowmeter according to the present invention.

FIG. 4 shows a relationship between the rate of flow l as measured by the hot-wire pulse flowmeter of the present invention and the time interval which has elapsed after heating the fluid until detecting the same. A study of the graph indicates that the flowmeter has linearity for a wide range of rates of flow. In conventional or prior art arrangements, the heater 13 is periodically heated and an interval of time is measured which has elapsed after the fluid has been heated before the heated fluid is detected by the detector 19. In order to be able to measure the fluid when the fluid flows at either a high or a slow speed in such a prior art arrangement, it has been necessary that the heater be heated at a longer period. A longer interval of time than desirable has been needed for measuring the fluid as it flows at higher speeds. Where the speed of flow of the fluid changes at a rapid rate, such a change cannot be followed and no proper measurement has been made. Shortening the heating period results in a failure in measuring the fluid which flows at lower speeds.

With the arrangement according to the present invention, the heater 13 is heated on the basis of the output from the detector 19, such that the heating period can automatically be shortened when the fluid flows at higher speeds, and be increased when the fluid flows at lower speeds. Accordingly, as shown in FIG. 4, the flowmeter of the invention can measure fluids which flow at a wide range of speeds, and can also follow changes in the speed of flow to produce measured outputs.

The detection pulse Sc from the detector 19 may be used instead of the drive timing signal $S_T$ for driving the pulse width setting circuit 10. In such an alternative, the period at which the heater 13 is heated becomes excessively small when the fluid flows at higher speeds, and when the heater 13 is heated before it is sufficiently cooled down, no proper pulse Sc is available from the detector 19. To cope with this, the time interval which elapses after the detection pulse Sc has been produced and before the heater 18 is heated again should be increased. Although the rate of flow can be measured with such time interval being constant, the time interval may be rendered dependent on the rate or speed of flow for facilitating arithmetic operations to measure the rate or speed of flow in the measurement circuit 3. Although the time interval has been described as being a time To required for the fluid as heated by the heater 13 to reach the detector 19, the output reference signal from the terminal 25b of the oscillator 25 in FIG. 3 may have a period which is twice, three times, four times, ... longer than the period of the reference signal from the terminal 25a so that the time interval can be twice, three times, four times, ... longer than the time To.

As described above with reference to FIG. 6, the fluid being measured can be heated to a constant temperature irrespectively of the speed of flow of the fluid for thereby detecting the rate or speed of flow of the fluid reliably with the detector 19. An expiration or inspiration can be properly measured for its rate of flow even when the rate of flow changes to a large extent during measurement. The timer 4, the pulse generator 5 and the switch circuit 6 are employed to preheat the heater 13 when the rate of flow is below a predetermined level. This arrangement allows proper measurement of the rate of flow of the fluid as supplied abruptly with its sudden increase taken properly into account. Thus, the flowmeter of the present invention is suited for measuring expiration and inspiration. The detectors 19-1, 19-2 are employed to detect the rate of flow reliably with the detector 19-1 notwithstanding changes in the ambient temperature and the temperature of the fluid being measured.

When the fluid 101 flowing through the pipe 11 is subjected to external vibrations, it sometimes become difficult for the detector 19 to detect the fluid 101 as heated. Such a problem can be eliminated by an arrangement shown in FIGS. 7 and 8. The pipe 11 as shown for passage therethrough of the fluid 101 is made of acrylic resin and has an inside diameter of 33 mm and a length of 12 cm. A pair of parallel heating wires 13a, 13b extend substantially normal to the axis of the pipe 11. The heating wires 13a, 13b are in the form of tungsten wires having a diameter of 5 microns and a length of 30 mm, and have ends secured to the wall of the pipe 11 by holders g-1, g-2 and g-3, g-4, respectively. The heating wires 13a, 13b are spaced from each other by a distance such that zones 111a, 111b of the fluid 101 which are heated respectively by the heating wires 13a, 13b will be close to each other at maximum. The heating wires 13a, 13b are connected in common to the heater circuit unit 14 (FIG. 1).

Figure 7:
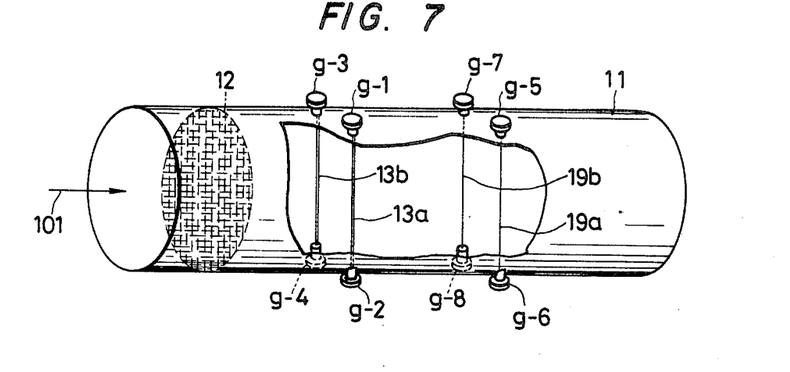
FIG. 7 is a perspective view, partly cut away, of heaters and detectors according to another embodiment.
Figure 8:
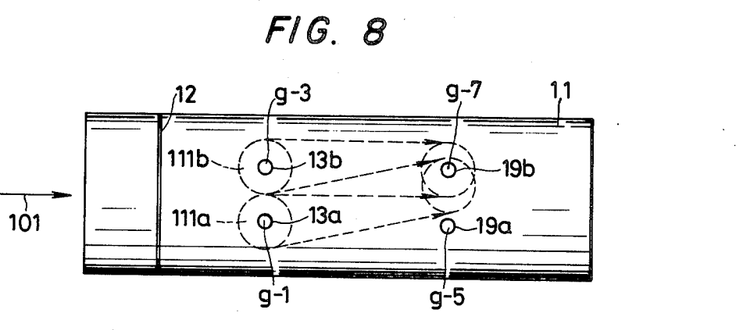
FIG. 8 is a plan view of the heaters and detectors illustrated in FIG. 7.

A pair of parallel thermosensitive wire elements 19a, 19b are disposed downstream of the heating wires 13a, 13b with respect to the direction of flow of the fluid 101 at a position spaced from the wires 13a, 13b by a distance ranging from 4 to 14 mm. The thermosensitive wire elements 19a, 19b comprise, for example, tungsten wires having a diameter of 5 microns and a length of 30 mm and are secured at the ends thereof to the wall of the pipe 11 by holders g-5, g-6 and g-7, g-8, respectively. The thermosensitive wire elements 19a, 19b are connected to the thermosensitive circuit 20 shown in FIG. 1 which ORs the outputs from the thermosensitive wire elements 19a, 19b.

When the heating wires 13a, 13b are heated by the heating pulse $S_H$, the fluid which traverses the heating wires 13a, 13b are heated thereby. As shown in FIG. 8, the fluid portions 111a, 111b indicated by the dotted lines are heated respectively by the heating wires 13a, 13b, and such heated fluid portions 111a, 111b flow downstream along the axis of the pipe 11.

As long as the fluid flows normally without being disturbed, the fluid portions 111a, 111b pass across the thermosensitive wire elements 19a, 19b, respectively, whereupon the fluid portion 111a is detected by the thermosensitive wire element 19a and the fluid portion 111b is detected by the thermosensitive wire element 19b. The fluid portion 111a may be disturbed by an external cause such as external vibrations applied to the pipe 11 or an internal cause such as a temperature change of the fluid itself, and may then flow along the arrows shown in FIG. 8. This flow disturbance prevents the heated fluid portion 111a from properly reaching the thermosensitive wire element 19a, but forces the fluid portion 111a to be displaced in a direction normal to the axis of the pipe 11. Therefore, the thermosensitive wire element 19a fails to detect the fluid portion 111a or produces an output which is extremely weak. With the arrangement of FIGS. 7 and 8, however, the heated fluid portion 111a can be detected by the thermosensitive wire element 19b as illustrated in FIG. 8. Accordingly, the heated fluid portion can be detected with high sensitivity even when it is displaced perpendicularly to the axis of the pipe 11 around the thermosensitive wire elements. While in the illustrated embodiment of FIGS. 7 and 8 two parallel heating wires and two parallel thermosensitive wire elements are mounted tautly in the pipe 11, it will suffice for at least either heating wires or thermosensitive wire elements to be provided in plurality. For example, there may be provided a single heating wire and three thermosensitive wire elements.

Figure 9:
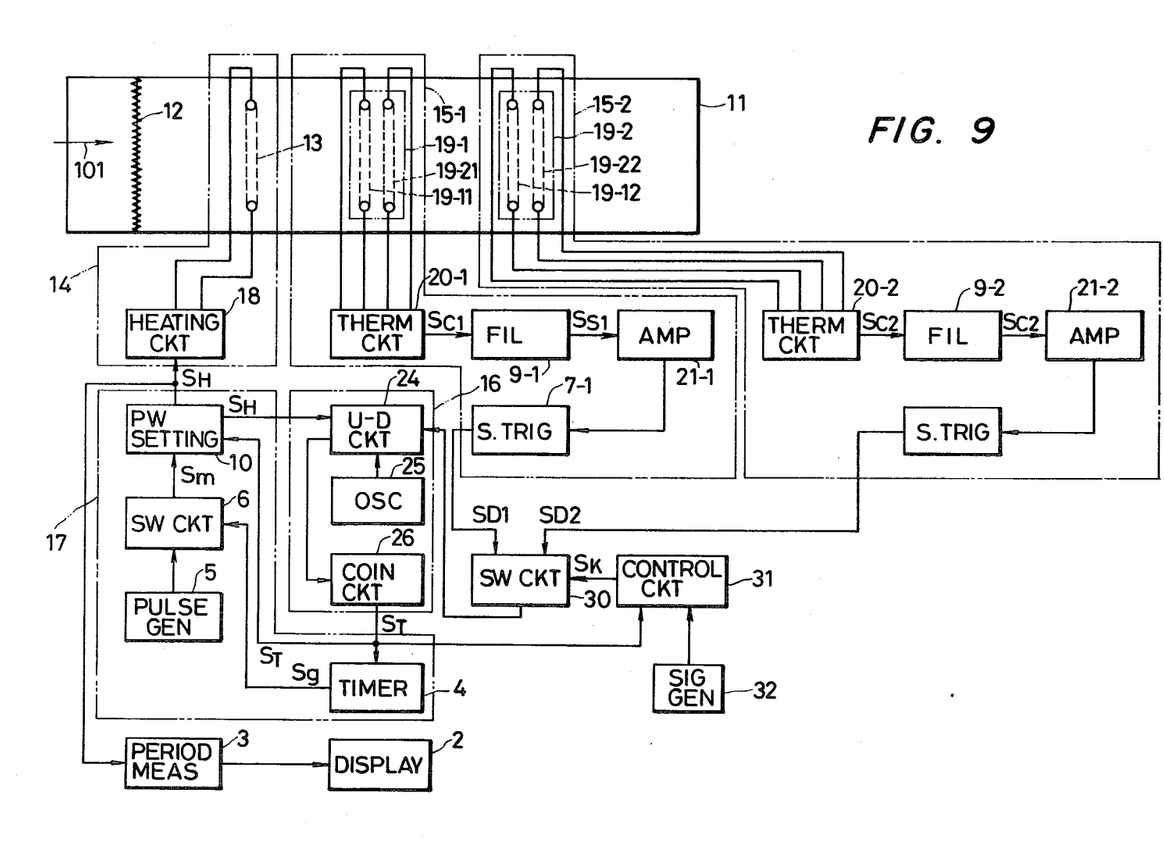
FIG. 9 is a block diagram of a thermal pulse flowmeter having a wider range of measurements according to still another embodiment of the present invention.

The flowmeter according to the present invention can measure fluids which are subjected to more changes in rate of flow than conventional thermal-pulse type flowmeters can measure. For a wider range of measurements, the flowmeter can be arranged to effect measurements in divided modes one for flow rates at low speeds of flow and the other for flow rates at high speeds of flow. Such an arrangement is illustrated in FIG. 9. Corresponding parts in FIG. 9 are denoted by corresponding reference characters shown in FIG. 1. A detector 19-1 for detecting fluids flowing at low speeds is disposed downstream of a heater 13, and a detector 19-2 for detecting fluids flowing at high speeds is disposed downstream of the detector 19-1. The low-speed fluid detector 19-1 is composed of detectors 19-11, 19-21 which correspond to the detectors 19-1, 19-2 as shown in FIG. 1. The detector 19-1 is connected to a thermosensitive circuit 20-1 which is connected to a filter 9-1, an amplifier 21-1, and a Schmitt trigger 7-1. Likewise, the high-speed fluid detector 19-2 is coupled to a thermosensitive circuit 20-2 that is connected to a filter 9-2, an amplifier 21-2, and a Schmitt trigger 7-2. Thus, there are provided a low-speed fluid thermosensitive circuit unit 15-1 and a high-speed fluid thermosensitive circuit unit 15-2.

The Schmitt triggers 7-1, 7-2 in the low-speed and high-speed fluid thermosensitive circuit units 15-1, 15-2 deliver their outputs to a switch circuit 30.

The switch circuit 30 is controlled to switch over by an output from a control circuit 31 having an input terminal supplied with a drive timing signal $S_T$ from a coincidence circuit 26 and another input terminal supplied with an output from a reference signal generator 32. The control circuit 31 serves to compare a period of the drive timing signal $S_T$ with a switching period Tm which is predetermined by the reference signal generator 32. The switching period Tm serves as a reference when effecting switching between the low-speed fluid detector 19-1 and the high-speed fluid detector 19-2 dependent on the rate of flow of the fluid through the pipe 11. While the period of the drive timing signal $S_T$ generated from the coincidence circuit 26 is greater than the switching period Tm, an output operation signal $S_{D1}$ from the Schmitt trigger 7-1 is picked up by the switch circuit 30 and supplied to a drive timing signal generator 16 in order to pick up a signal detected by the low-speed fluid detector 19-1.

When the period of the drive timing signal $S_T$ coming from the coincidence circuit 26 becomes smaller than the period Tm as the rate of flow of the fluid through the pipe 11 increases, the switch circuit 30 is switched over by the control circuit 31 to supply an output operation signal $S_{D2}$ from the Schmitt trigger 7-2 to the drive timing signal generator 16 in order to pick up a signal detected by the high-speed fluid detector 19-2.

The control circuit 31 may comprise a digital comparator, for example, for supplying the count in an up-down counter 24 just prior to starting count-down operation, as an input to the control circuit 31 for comparison with the switching period Tm given as a digital value from the reference signal generator 32. The switch circuit 30 may then be switched over dependent on the result of comparison.

Figure 10:
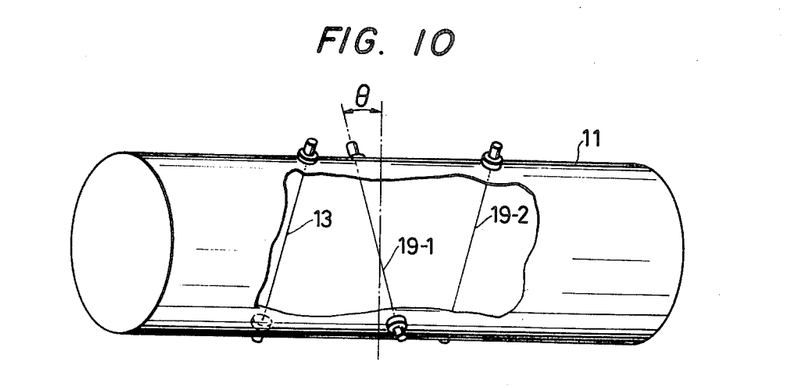
FIG. 10 is a perspective view, partly broken away, of a heater and detectors preferably arranged with respect to each other in the thermal pulse flowmeter shown in FIG. 9.

It can readily be understood that use of the low-speed and high-speed fluid thermosensitive circuit units 15-1, 15-2 results in a wider range of measurements than that which can be attained by the flowmeter shown in FIG. 1. For equalizing the detection output levels of the low-speed and high speed fluid detectors 19-1, 19-2, the high-speed fluid detector 19-2 may extend parallel to the heater 13 and the low-speed fluid detector 19-1 may be angularly displaced in a plane normal to the axis of the pipe 11, and inclined slightly with respect to the heater 13 as shown in FIG. 10.

We claim:

1. A thermal pulse flowmeter comprising a pipe for passage therethrough of a fluid to be measured, a heater disposed in said pipe for heating the fluid, a heater circuit for pulsatively heating said heater, a detector disposed in said pipe downstream of said heater with respect to the direction of flow of the fluid and responsive to a change in the temperature of the fluid, a thermosensitive circuit for detecting passage of a heated portion of the fluid across said detector, a drive timing signal generator for generating a drive timing signal for said heater circuit with a time delay greater by a multiple of an integer than an interval of time which has elapsed after said heater has been pulsatively heated and prior to detection by said thermosensitive circuit, and a measurement circuit for measuring a period at which said heater is heated to derive therefrom the speed or rate of flow of the fluid.

2. A thermal pulse flowmeter according to claim 1, wherein said drive timing signal generator includes a counter for starting to count a reference signal upon heating of said heater, said drive timing signal generator being arranged such that it will generate said drive timing signal when the reference signal is counted to a count which is equal to the count which has been counted until the output is produced from said thermosensitive circuit.

3. A thermal pulse flowmeter according to claim 2, wherein said counter comprises an up-down counter for starting to count up the reference signal upon heating of the heater, said up-down counter being capable of counting down the reference signal in response to detection by said thermosensitive circuit, so that said drive timing signal can be generated when the count in said up-down counter becomes zero in a previous countdown operation.

4. A thermal pulse flowmeter comprising a pipe for passage therethrough of a fluid whose rate of flow is to be measured, a heater disposed in said pipe for heating the fluid, a heater circuit for pulsatively heating said heater, a detector disposed in said pipe downstream of said heater with respect to the direction of flow of the fluid and responsive to a change in the temperature of the fluid, a thermosensitive circuit for detecting passage of a heated portion of the fluid across said detector, a drive timing signal generator for generating a drive timing signal for said heater circuit in response to an output from said thermosensitive circuit, a timer responsive to each drive timing signal for generating an inhibit gate signal having a predetermined width corresponding to a measurable minimum rate of flow of the fluid, a pulse generator for generating pulses, a switch circuit for supplying pulses from said pulse generator to said heater circuit to effect heating of said heater, said switch circuit being responsive to said inhibit gate signal for preventing application of said pulses from said pulse generator to said heater circuit during the presence of said inhibit gate signal, and a measurement circuit for measuring the period at which said heater is heated by pulses controlled by said drive timing signal to derive therefrom the speed or rate of flow of the fluid.

5. A thermal pulse flowmeter according to claim 1 or 4, wherein said heater circuit includes a constant-heating means for heating the fluid at a substantially constant temperature irrespectively of conditions of the fluid.

6. A thermal pulse flowmeter according to claim 5, wherein said heater comprises a heating wire having a resistance which can increase with temperature, said constant-heating means comprising means for comparing a voltage drop across said heater with a reference voltage to control a current flowing through said heater so that said voltage drop and said reference voltage will be equalized.

7. A thermal pulse flowmeter according to claim 6, wherein said constant-heating means comprises a resistance bridge circuit including said heater, a differential amplifier for amplifying an output from said resistance bridge circuit, and a variable impedance element controllable by an output from said differential amplifier and inserted in series in a current passage to said resistance bridge circuit.

8. A thermal pulse flowmeter according to claim 1 or 4, including a compensation detector disposed in said pipe out of contact with the heated portion of the fluid and responsive to a temperature change, said compensation detector having the same temperature-dependent characteristics as those of said detector, and compensation means for compensating for a temperature variation of said detector with said compensation detector.

9. A thermal pulse flowmeter according to claim 8, wherein said detector and said compensation detector comprise thermosensitive resistors, said compensation means comprising a resistance bridge circuit having said detector and said compensation detector in adjacent bridge branches.

10. A thermal pulse flowmeter comprising a pipe for passage therethrough of a fluid to be measured, a heater disposed in said pipe for heating the fluid, a heater circuit for pulsatively heating said heater, a detector disposed in said pipe downstream of said heater with respect to the direction of flow of the fluid and responsive to a change in the temperature of the fluid, a thermosensitive circuit for detecting passage of a heated portion of the fluid across said detector, a drive timing signal generator for generating a drive timing signal for said heater circuit in response to an output from said thermosensitive circuit, and a measurement circuit for measuring a period at which said heater is heated to derive therefrom the speed or rate of flow of the fluid, said thermosensitive circuit comprising means for detecting a minimum level of an electric signal generated from said detector, means for adding a certain level to the detected minimum level to produce a reference level, and a comparator for comparing the electric signal from said detector with said reference level and for detecting passage of the heated portion of the fluid across said detector when said electric signal is greater than said reference level.

11. A thermal pulse flowmeter according to any one of claims 1 through 4 or claim 10, wherein said heater and said detector comprise wires extending parallel to each other, said heater comprising a plurality of substantially parallel wires extending substantially normal to the direction of flow of the fluid.

12. A thermal pulse flowmeter according to any one of claims 1 through 4 or claim 10, wherein said heater and said detector comprise wires extending substantially parallel to each other, said detector comprising a plurality of substantially parallel wires extending substantially normal to the direction of flow of the fluid.

13. A thermal pulse flowmeter according to any one of claims 1 through 4 or claim 10, including a second detector disposed in said pipe on an opposite side of said heater remote from said first mentioned detector, said second detector being responsive to a temperature change.

14. A thermal pulse flowmeter comprising a pipe for passage therethrough of a fluid to be measured, a heater disposed in said pipe for heating the fluid, a heater circuit for pulsatively heating said heater, a first detector disposed in said pipe downstream of said heater with respect to the direction of flow of the fluid and responsive to a change in the temperature of the fluid, a thermosensitive circuit for detecting passage of a heated portion of the fluid across said detector, a drive timing signal generator for generating a drive timing signal for said heater circuit in response to an output from said thermosensitive circuit, a measurement circuit for measuring a period at which said heater is heated to derive therefrom the speed or rate of flow of the fluid, a second detector disposed in said pipe downstream of said first detector, a second thermosensitive circuit for detecting passage of the heated portion of the fluid across said second detector, and a switch circuit for supplying an output from either said second thermosensitive circuit or said thermosensitive circuit to said drive timing signal generator.

15. A thermal pulse flowmeter according to claim 14, including a control circuit for comparing the period of said drive timing signal with a set period and for controlling said switch circuit to supply the output from said second thermosensitive circuit to said drive timing signal generator when said period of the driving timing signal is shorter than said set period.

16. A thermal pulse flowmeter according to claim 14 or 15, wherein said heater comprises an elongated heating wire extending through said flowing fluid in a direction perpendicular to the direction of flow of said fluid, said second detector being an elongated thermosensitive resistor extending through said flowing fluid in a direction parallel to said heating wire, and said first detector being an elongated thermosensitive resistor extending through said flowing fluid in a direction slightly inclined to said heating wire.

* * * * *